US007409514B2

(12) United States Patent
Saika

(10) Patent No.: US 7,409,514 B2
(45) Date of Patent: Aug. 5, 2008

(54) METHOD AND APPARATUS FOR DATA MIGRATION BASED ON A COMPARISON OF STORAGE DEVICE STATE INFORMATION

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 252 days.

(21) Appl. No.: 11/016,815

(22) Filed: Dec. 21, 2004

(65) Prior Publication Data
US 2006/0090049 A1 Apr. 27, 2006

(30) Foreign Application Priority Data
Oct. 27, 2004 (JP) ............................. 2004-311809

(51) Int. Cl.
*G06F 12/00* (2006.01)
(52) U.S. Cl. ........................ 711/165; 711/147; 711/154; 709/224; 710/15; 710/19
(58) Field of Classification Search .................. 707/10, 707/204; 709/219; 711/147, 148, 161, 165
See application file for complete search history.

(56) References Cited

U.S. PATENT DOCUMENTS

| 5,155,835 | A * | 10/1992 | Belsan ........................ 711/114 |
| 6,779,034 | B1 * | 8/2004 | Mundy et al. ................ 709/227 |
| 2002/0004857 | A1 * | 1/2002 | Arakawa et al. ................ 710/1 |
| 2002/0091746 | A1 * | 7/2002 | Umberger et al. ........... 709/105 |
| 2002/0156891 | A1 * | 10/2002 | Ulrich et al. ................. 709/225 |
| 2003/0046270 | A1 * | 3/2003 | Leung et al. .................... 707/1 |
| 2003/0110237 | A1 * | 6/2003 | Kitamura et al. ............. 709/219 |
| 2003/0200308 | A1 | 10/2003 | Tameda et al. |
| 2004/0049513 | A1 * | 3/2004 | Yakir et al. .................. 707/100 |
| 2005/0125456 | A1 * | 6/2005 | Hara et al. ................... 707/200 |
| 2005/0193181 | A1 * | 9/2005 | Kaneda et al. ............... 711/162 |

OTHER PUBLICATIONS

"Automating Storage and Data Resource Management with the Arkivio auto-stor Software",2002, Arkivio Inc., pp. 1-14.*
"EMC Avalonidm: Intelligent data management to lower total cost of storage", 2003, EMC Corporation.*

* cited by examiner

*Primary Examiner*—Kevin Ellis
*Assistant Examiner*—Kalpit Parikh
(74) *Attorney, Agent, or Firm*—Mattingly, Stanger, Malur & Brundidge, P.C.

(57) ABSTRACT

The apparatus (3, 11) comprises a first input part (5, 43) which inputs first utilization state information that indicates information relating to the utilization state of first shared data in the respective first data control devices, a second input part (5, 43) which inputs second utilization state information that indicates information relating to the utilization state of second shared data in the respective second data control devices, and a selection part (5, 43) which compares the input first utilization state information and second utilization state information to each other, selects the data among the first shared data or the second shared data, that is to be used as the migration object data on the basis of the results of this comparison, selects the data migration destination from the one or more first data control devices or the plurality of second data control devices, and outputs information relating to the selection results.

9 Claims, 15 Drawing Sheets

FIG. 3A

| #DISCLOSED DIRECTORY | DISCLOSED DESTINATION HOST (ACCESS AUTHORIZATION) |
|---|---|
| /share1 | client01(rw) client02(ro) |
| . | . |
| . | . |

FIG. 3B

NUMBER OF ACCESS USERS (NUMBER OF HOSTS) : 200/800(max)
TOTAL SHARED DIRECTORY NUMBER : 150/400(max)
TOTAL SHARED FILE SIZE : 6GB/100GB(max)

FIG. 4A

| DATE | ACCESS SOURCE (HOST NAME OR IP ADDRESS) | ACCESS DESTINATION (SHARED DIRECTORY) | OPERATION (READ/WRITE) | SIZE |
|---|---|---|---|---|
| 20040811 | 192.168.1.5 | /share | write | 500KB |
| .. | | | | .. |

FIG. 4B

| SHARED DIRECTORY | NUMBER OF ACCESS USERS | READ SIZE | WRITE SIZE |
|---|---|---|---|
| /share-0 | 10 | 1000 | 250 |
| /share-1 | 1 | 500 | 1000 |
| .. | .. | | .. |

FIG. 5A

| #DISCLOSED DIRECTORY | DISCLOSED DESTINATION HOST (ACCESS AUTHORIZATION) |
|---|---|
| /share1 | client01(rw) client02(ro) |
| . | . |
| . | . |

FIG. 5B

NUMBER OF ACCESS USERS (NUMBER OF HOSTS) : 100
TOTAL SHARED DIRECTORY NUMBER : 50
TOTAL SHARED FILE SIZE : 10GB

FIG. 6A

```
NAS1 :
#NUMBER OF ACCESS USERS (NUMBER OF HOSTS) : 200/800(max)
TOTAL SHARED DIRECTORY NUMBER : 150/400(max)
TOTAL SHARED FILE SIZE : 6GB/100GB(max)

NAS2 :
#NUMBER OF ACCESS USERS (NUMBER OF HOSTS) : 250/300(max)
#TOTAL SHARED DIRECTORY NUMBER : 100/200(max)
#TOTAL SHARED FILE SIZE : 6GB/100GB(max)
```
~171

FIG. 6B

```
DEPARTMENT SERVER 1 :
#NUMBER OF ACCESS USERS (NUMBER OF HOSTS) : 100
TOTAL SHARED DIRECTORY NUMBER : 50
TOTAL SHARED FILE SIZE : 10GB

DEPARTMENT SERVER 2 :
#NUMBER OF ACCESS USERS (NUMBER OF HOSTS) : 150
#TOTAL SHARED DIRECTORY NUMBER : 80
#TOTAL SHARED FILE SIZE : 20GB
                    :
```
~173

FIG. 6C

| SHARED DIRECTORY | NUMBER OF ACCESS USERS | TOTAL READ SIZE | TOTAL WRITE SIZE |
|---|---|---|---|
| /share-0 | 10 | 1000 | 250 |
| /share-1 | 1 | 500 | 1000 |
| . | . | . | . |

FIRST SETTING POLICY (DEPARTMENT SERVER→NAS)

<MIGRATION TIMING POLICY:
   ACCORDING TO NUMBER OF ACCESS USERS>
 WARNING IF NUMBER OF FILE SHARING UTILIZATION USERS
 < 10
     PRELIMINARY NOTIFICATION OF MIGRATION IF 10 <
  NUMBER OF ACCESS USERS < 20
  MIGRATION IF 20 < NUMBER OF ACCESS USERS

<MIGRATION TIMING POLICY:
   ACCORDING TO SHARED FILE SIZE>
 WARNING IF SHARED FILE SIZE < 1 GB
 PRELIMINARY NOTIFICATION OF MIGRATION IF 1 GB <
   SHARED FILE SIZE < 2 GB
 MIGRATION IF 2 GB < SHARED FILE SIZE

<MIGRATION DESTINATION POLICY>
 MIGRATION SOURCE: MIGRATION DESTINATION CANDIDATES
 DEPARTMENT SERVER 1: NAS1, NAS2
 DEPARTMENT SERVER 2: NAS2, NAS3
 DEPARTMENT SERVER 3: NAS3, NAS4

SECOND SETTING POLICY (NAS→DEPARTMENT SERVER)

<MIGRATION TIMING POLICY: ACCORDING TO
NUMBER OF ACCESSES)
 MIGRATION IF NUMBER OF ACCESS HOSTS < 2
 PRELIMINARY NOTIFICATION OF MIGRATION IF 2 <
 NUMBER OF FILE SHARING UTILIZATION USERS < 5

<MIGRATION TIMING POLICY: ACCORDING TO TOTAL
   READ/WRITE SIZE>
 WARNING IF TOTAL READ/WRITE SIZE < 10 GB
 PRELIMINARY NOTIFICATION OF MIGRATION IF 10 GB <
   TOTAL READ/WRITE SIZE < 20 GB
 MIGRATION IF 20 GB < TOTAL READ/WRITE SIZE

| DIRECTORY NAME | NUMBER OF ACCESS USERS | NUMBER OF TIMES OF READING | NUMBER OF TIMES OF WRITING |
|---|---|---|---|
| /usr/holder 1 | 10 | 5 | 10 |
| /usr/holder 2 | 20 | 7 | 7 |
| ⋮ | ⋮ | ⋮ | ⋮ |

FIG. 10B

| DIRECTORY NAME | HOST NAME/ IP ADDRESS |
|---|---|
| /usr/holder 1 | 192.168.10.1 |
| ⋮ | ⋮ |

FIG. 11

```
PROCESSING START (INPUT INFORMATION :
  SETTING INFORMATION RELATING TO FILE SHARING)
  |
  O  VOLUME ASSIGNMENT REQUEST (S41)
  |
  O  MOUNTING OF VOLUME (S42)
  |
  O  INITIALIZATION OF VOLUME (FILE SYSTEM CONSTRUCTION) (S43)
  |
  O  SETTING INFORMATION RELATING TO FILE SHARING MERGED
  |  WITH MIGRATION DESTINATION (S44)
  O  (REGISTRATION OF USER ACCOUNTS CONTAINED IN SETTING
  |  INFORMATION RELATING TO FILE SHARING)
END
```

FIG. 13

PROCESSING START (INPUT INFORMATION: MIGRATION DESTINATION NAS NAME)
- ○ SETTING INFORMATION RELATING TO FILE SHARING IN DEPARTMENT SERVER ACQUIRED (S61)
- ○ SHARING SETTING PROCESSING PART CALLED UP FOR DETERMINED MIGRATION DESTINATION NAS, AND FILE SHARING SETTING EXECUTED (S62)
- ○ EXECUTION OF FILE COPYING (S63)
- ○ PREPARATION OF MOUNTING POINT AND MOUNTING (S64)

END PROCESSING

FIG. 14

PROCESSING START (INPUT INFORMATION: MIGRATION DESTINATION SERVER NAME)
- ○ SAVING REQUEST FOR SAN-CONNECTED VOLUME (S71)
- ○ MOUNTING OF VOLUME (S72)
- ○ VOLUME INITIALIZATION (S73)
- ○ COPYING (NAS SHARED DIRECTORY→SAN-CONNECTED VOLUME) (S74)

END PROCESSING

METHOD AND APPARATUS FOR DATA MIGRATION BASED ON A COMPARISON OF STORAGE DEVICE STATE INFORMATION

CROSS-REFERENCE TO PRIOR APPLICATION

This application relates to and claims priority from Japanese Patent Application No. 2004-311809, filed on Oct. 27, 2004, the entire disclosure of which is incorporated herein by reference.

BACKGROUND OF THE INVENTION

1. Field of the Invention

The present invention relates to a computer technique that is used to select data migration destinations.

2. Description of the Related Art

For example, in cases where a file sharing environment is constructed in a business that is conducted while being divided into a plurality of departments, there are instances in which the following first method is employed. Specifically, a plurality of client machines and one or more server machines are installed in each department. In each department, the server machines store shared data files (hereafter referred to as shared data), and the plurality of client machines share the shared data that is stored by the server machines.

Furthermore, for example, as is disclosed in Pub. No. US 2003/0200308, there is a second method in which information is gathered by means of an agent program that operates in the server machines in order to grasp the operating conditions of the server machines, and information relating to the operating conditions (e.g., information indicating that trouble has occurred) is provided to a manager.

SUMMARY OF THE INVENTION

In cases where the abovementioned first method is employed, the number of server machines that must be installed increases as the number of departments increases, so that some cost is involved. Furthermore, in cases where the server machines installed in the plurality of departments are concentrated in order to reduce costs, work involving the migration of data to the destinations of such concentration is extremely bothersome for the manager.

Furthermore, even if the abovementioned two methods are employed, the conditions of generation of the file servers cannot be investigated.

Accordingly, it is one object of the present invention to realize data migration that places little burden on the manager.

Another object of the present invention is to allow the manager to ascertain the generation of the file servers.

Another object of the present invention is to effect the migration of data files stored in a certain location to other appropriate locations. In concrete terms, for example, another object of the present invention is to select data files for which access via an SAN (storage area network) is appropriate from a plurality of data files present in an NAS (network attached storage), and to effect the migration of these data files to a separate storage via an SAN.

Other objects of the present invention will become clear from the following description.

One or more first data control devices that control first shared data and a plurality of second data control devices that control second shared data are provided. In this case, the apparatus according to a first aspect of the present invention (hereafter referred to as the first apparatus) comprises a first input part which inputs first utilization state information that indicates information relating to the utilization state of the abovementioned first shared data in the respective first data control devices, a second input part which inputs second utilization state information that indicates information relating to the utilization state of the abovementioned second shared data in the respective second data control devices, and a selection part. The selection part compares the abovementioned input first utilization state information and second utilization state information to each other, selects data among the abovementioned first shared data or the abovementioned second shared data, that is to be used as the migration object data on the basis of the results of this comparison, selects the data migration destination from the abovementioned one or more first data control devices or the abovementioned plurality of second data control devices, and outputs information relating to the selection results.

In a first embodiment of the first apparatus, the first apparatus further comprises a migration part that migrates the abovementioned selected migration object data to the abovementioned selected migration destination.

In a second embodiment of the first apparatus, the abovementioned selection part inputs selection policy data in which conditions used to select the migration object data and migration destination are written, and selects migration object data and a migration destination that match the conditions written in the input selection policy data.

In a third embodiment of the first apparatus, the abovementioned first utilization state information is information that is produced by the abovementioned first data control devices on the basis of setting information relating to data sharing in the first data control devices. Furthermore, the abovementioned second utilization state information is information that is produced by the abovementioned second data control devices on the basis of setting information relating to data sharing in the second data control devices.

One or more first data control devices that control the first shared data, and a plurality of second data control devices that control the second shared data, are provided. In this case, a method according to a second aspect of the present invention comprises the step of inputting first utilization state information that indicates information relating to the utilization state of the abovementioned first shared data in the respective first data control devices, the step of inputting second utilization state information that indicates information relating to the utilization state of the abovementioned second shared data in the respective second data control devices, and the step of comparing the abovementioned first utilization state information and second utilization state information to each other, selecting which data among the abovementioned first shared data and the abovementioned second shared data is to be taken as the data that is the object of migration on the basis of the results of this comparison, further selecting the data migration destination from the abovementioned one or more first data control devices or the abovementioned plurality of second data control devices, and outputting information relating to the results of this selection.

One or more servers that control first shared data that is shared by a plurality of clients, and a plurality of NAS that store a plurality of sets of second shared data, are provided. In this case, an apparatus according to a third aspect of the present invention (hereafter referred to as the third apparatus) comprises a first input part that receives from the respective servers server state information that indicates information relating to the utilization state of first shared data in the respective servers, and a selection part. The selection part [comprises] a second input part that receives NAS state information that indicates information relating to the utilization state of the respective NAS from the respective NAS; this selection part compares the abovementioned input server state information and NAS state information to each other, selects which data among the abovementioned plurality of first shared data or abovementioned plurality of second shared data is to be taken as the data that is the object of migration on the basis of the comparison results, further selects the data migration destination from the abovementioned one or more servers or the abovementioned plurality of NAS, and outputs information relating to the results of this selection.

In a first embodiment of the third apparatus, the third apparatus further comprises a migration part that migrates the abovementioned selected migration object data to the abovementioned selected migration destination.

In a second embodiment of the third apparatus, in a case where the first shared data is selected as the abovementioned migration object data and an NAS is selected as the migration destination in the abovementioned first embodiment, the abovementioned migration part acquires setting information relating to data sharing in the server that controls the abovementioned first shared information, merges the acquired setting information with the migration destination NAS, prepares a storage region in this NAS, and migrates the abovementioned migration object data to the prepared storage region.

In a third embodiment of the third apparatus, a storage control device is connected to an SAN in the abovementioned first embodiment, and the abovementioned storage control device can prepare a logical volume. The abovementioned second shared data is stored in a shared directory of the NAS. In a case where second shared data is selected as the abovementioned migration object data, and one of the abovementioned one or more servers is selected as the migration destination, the abovementioned migration part migrates the second shared data selected as the abovementioned object of migration from the abovementioned shared directory to the abovementioned logical volume.

In a fourth embodiment of the third apparatus, the abovementioned selection part inputs selection policy data in which a policy for selecting migration object data and migration destinations is written, and selects migration object data and migration destinations that match the conditions written the input selection policy data.

In a fifth embodiment of the third apparatus, the abovementioned selection part receives access state information from the respective NAS indicating the access state in the NAS; this selection part performs a selection on the basis of the results of the abovementioned comparison in cases where an NAS is selected as the migration destination, and performs a selection on the basis of the abovementioned received access state information in cases where a server is selected as the migration destination.

In a sixth embodiment of the third apparatus, the abovementioned selection part in the abovementioned fifth embodiment inputs selection policy data in which a policy for selecting migration object data and migration destinations is written, and selects migration object data and a migration destination that match the policy written in the input selection policy data. A first policy which is a policy for migrating first shared data from the servers to the NAS, and second policy which is a policy for migrating second shared data from the NAS to the servers, are written in the abovementioned selection policy data; furthermore, a policy relating to the server state information and NAS state information is contained in the abovementioned first policy, and a policy relating to the abovementioned access state information is contained in the abovementioned second policy.

In a seventh embodiment of the third apparatus, the abovementioned server state information is information that is produced by the abovementioned servers on the basis of setting information relating to data sharing in the servers. The abovementioned NAS state information is information that is produced by the abovementioned NAS on the basis of setting information relating to data sharing in the NAS.

One or more servers which control first shared data that is shared by a plurality of clients, and a plurality of NAS that store a plurality of sets of second shared data, are provided. In this case, a method according to a fourth aspect of the present invention (hereafter referred to as the fourth method) comprises a step of receiving from the respective servers server state information which indicates information relating to the utilization state of first shared data in the respective servers, a step of receiving from the NAS NAS state information which indicates information relating to the utilization state of the respective NAS, and the step of comparing the abovementioned input server state information and NAS state information to each other, selecting which data among the abovementioned plurality of sets of first shared data or abovementioned plurality of sets of second shared data is to be taken as the migration object data on the basis of the results of this comparison, further selecting the data migration destination from the abovementioned one or more servers or the abovementioned plurality of NAS, and outputting information relating to the results of this selection.

In one embodiment of the fourth method, the abovementioned servers [each] comprise a server side monitoring part which monitors setting information relating to data sharing in the servers. The abovementioned NAS [each] comprise an NAS side monitoring part which monitors setting information relating to data sharing in the NAS. In this case, the abovementioned method further comprises the following steps (A) and (B).

(A) A step in which the abovementioned server side monitoring part produces the abovementioned server state information on the basis of setting information relating to data sharing in the servers, and outputs the abovementioned produced server state information, and (B) a step in which the abovementioned NAS side monitoring part produces the abovementioned NAS state information on the basis of setting information relating to data sharing in the NAS, and outputs the abovementioned produced NAS state information.

One or more servers which control first shared data that is shared by a plurality of clients, and a plurality of NAS that store a plurality of sets of second shared data, are provided. In this case, a computer program according to a fifth aspect of the present invention is a computer-readable computer program which is used to cause a computer to realize a step in which server state information which indicates information relating to the utilization state of first shared data in the respective servers is received from the respective servers, a step in which NAS state information which indicates information relating to the utilization state of the respective NAS is received from the respective NAS, and a step in which the abovementioned input server state information and NAS state information are compared to each other, the data among the abovementioned plurality of sets of first shared data or the abovementioned plurality of sets of second shared data that is to be taken as the migration object data is selected on the basis of the results of this comparison, the data migration destination is selected from the abovementioned one or more servers or the abovementioned plurality of NAS, and information relating to the results of this selection is output. This program can be recorded on a recording medium, and can be installed from this recording medium and executed.

Furthermore, the respective constituent elements of the abovementioned first apparatus and third apparatus can be constructed by means of computer programs; however, these constituent elements can also be constructed by means of hardware or by means of a combination of hardware and computer programs. The computer programs can be read into a specified processor and executed. Furthermore, a storage region located in a hardware resource such as a memory or the like can be appropriately used for the information processing that is performed by reading the computer programs into a processor.

The present invention makes it possible to realize data migration with little burden on the manager.

BRIEF DESCRIPTION OF THE DRAWINGS

FIG. 3A shows an example of the construction of the setting information that is input in the NAS;

FIG. 3B shows an example of the construction of the migration destination NAS information;

FIG. 4A shows an example of the construction of the NAS access log;

FIG. 4B shows an example of the construction of the NAS access state information;

FIG. 5A shows an example of the construction of the setting information that is input in the department server;

FIG. 5B shows an example of the construction of the migration source department server information;

FIG. 6A shows an example of the construction of the NAS tabulation information;

FIG. 6B shows an example of the construction of the department server tabulation information;

FIG. 6C shows an example of the construction of the NAS state tabulation information;

FIG. 7 shows an example of the construction of the policy data 161;

FIG. 10A shows an example of the construction of the first table;

FIG. 10B shows an example of the construction of the second table;

FIG. 11 shows one example of the flow of the processing that is performed by the sharing setting processing part;

FIG. 13 shows one example of the flow of the processing that is performed by the first file migration processing part in the department server machines;

FIG. 14 shows one example of the flow of the processing that is performed by the second file migration processing part in the department server machines.

DESCRIPTION OF THE PREFERRED EMBODIMENTS

Figure 1:
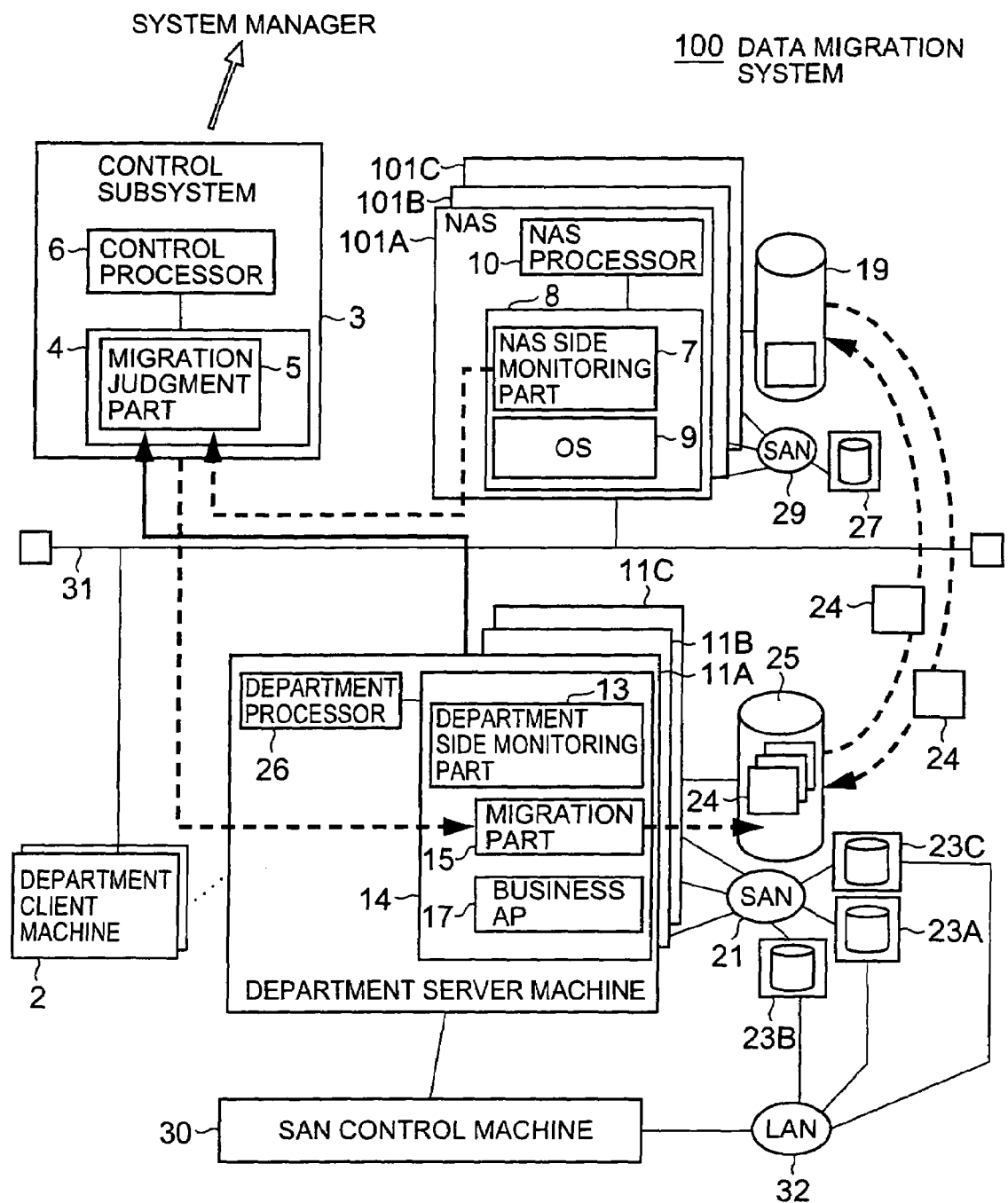
FIG. 1 shows an example of the construction of a data migration system according to one embodiment of the present invention.

FIG. 1 shows an example of the construction of a data migration system according to one embodiment of the present invention.

In the data migration system 100 of the present embodiment, a control subsystem 3, a plurality of NAS (network attached storage) (e.g., three NAS) 101A, 101B and 101C, a plurality of department server machines (e.g., three department server machines 11A, 11B and 11C and a department client machine 2 are connected to a communications network such as an LAN 31 or the like. A SAN 21 to which one or a plurality of storage control devices (e.g., three storage control devices) 23A, 23B and 23C are connected is connected to at least one of the department server machines 11A, 11B and 11C, and a SAN control machine 30 is also connected. The SAN control machine can access the storage control devices 23A, 23B and 23C via a separate LAN 32. Below, in cases where reference is made to any of the department server machines 11A, 11B and 11C [rather than to a single specific department server machine], these department server machines may be referred to simply as the "department server machines 11". Similarly, in cases where reference is made to any of the NAS 101A, 101B and 101C [rather than to a single specific NAS], these NAS may be referred to simply as "NAS 101". Similarly, furthermore, in cases where reference is made to any of the storage control devices 23A, 23B and 23C [rather than to a single specific storage control device], these storage control devices may be referred to simply as "storage control devices 23".

At least one part selected from the control subsystem 3, department server machines 11 and department client machines 2 can request data input and output in file units by designating file names. Furthermore, although this is not shown in the figures, at least one part selected from the control subsystem 3, department server machines 11 and department client machines 2 installs at least one OS selected from a set comprising the UNIX (registered trademark) operating system operated by NFS (network file system) and the Windows (registered trademark) operating system operated by CIFS (common interface file system). Furthermore, although this is not shown in the figures, at least one part selected from the control subsystem 3, department server machines 11, SAN control machine 30, NAS 101 and department client machines 2 comprises (for example) an information processing device such as a CPU (central processing unit), memory or the like; for example, this can be constructed as a personal computer, workstation, main frame or the like. Furthermore at least one part selected from the control subsystem 3, department server machines 11, SAN control machine 30, NAS 101 and department client machines 2 may comprise an information input device such as (for example) a keyboard switch, pointing device, microphone or the like (not shown in the figures), and an information output device such as (for example) a monitor display, speaker or the like.

The control subsystem 3 is a subsystem that is constructed from one or a plurality of computer machines. For instance, the control subsystem 3 is constructed by at least one control server or control client. For example, the control subsystem 3 comprises a control storage region 4 and a control processor 6.

The control storage region 4 is a storage region that is disposed in a storage device such as at least one memory or hard disk (not shown in the figures) possessed by the control subsystem 3 or the like; this control storage region 4 can store data or computer programs. For instance, one of the computer programs that is stored in the control storage region 4 is the migration judgment part 5. The migration judgment part 5 is operated by being read into the control processor 6. The migration judgment part 5 selects migration destinations for data (e.g., files or directories) from a plurality of migration destination candidates.

The control processor 6 is a processor (e.g., a CPU) that is installed in the control subsystem 3. The control processor 6 reads in the migration judgment part 5 from the control storage region 4, and executes the migration judgment part 5.

The department client machines 2 are client machines that are disposed in the respective departments. For example, the department client machines 2 can set a network drive (sometimes also referred to as a remote drive), and can access shared data 24 inside the storage devices 25 of the department server machines 11 via an LAN 31 in accordance with this setting.

The department server machines 11 comprise at least one storage device (hereafter referred to as a department storage device) 25, and can write data into this storage device 25. Furthermore, the department server machines 11 control which of the plurality of sets of data stored in the storage device 25 are shared data (data that can be accessed by a plurality of department client machines 2). The department server machines 11 have a file server function, and can function as file servers for a plurality of department client machines 2. For example, the department server machines 11 comprise a department storage region 14 and a department processor 16.

The department storage device 25 may be a physical storage device (e.g., a hard disk, optical storage medium, semiconductor memory or the like) or a logical storage device (e.g., a storage device called a logical unit or logical volume) that is disposed in one or a plurality of physical storage devices.

The department storage region 14 is a storage region that is disposed in a storage device such as at least one memory or hard disk (not shown in the figures) of the department server machines 11; this department storage region 14 can store data or computer programs. For example, the computer programs stored in the department storage region 14 include the department side monitoring part 13, migration part 15 and business application programs (hereafter referred to as business AP) 17 that execute specified processing. The department side monitoring part 13, migration part 15 and business AP 17 are operated by being read into the department processor 16. The department side monitoring part 13 monitors the utilization state if the shared data controlled by the department server machine 11 in which this department side monitoring part 13 is installed, and sends information based on the results of this monitoring to the control subsystem 3. The migration part 15 selects data whose migration to the NAS 101 is desirable from the plurality of sets of data stored in the department storage device 25, and migrates the selected data to the NAS 101. Furthermore, the migration part 15 selects data whose migration to the storage control device 23 via the SAN 21 is desirable from the plurality of sets of data stored in the department storage device 25, and migrates the selected data to the storage control device 23 via the SAN 21.

The department processor 16 is a processor (e.g., a CPU) that is installed in [each] department server machine 11. The department processor 16 reads in the department side monitoring part 13, migration part 15 and business AP 17 from the control storage region 4, and executes the read-in department side monitoring part 13, migration part 15 and business AP 17.

The SAN control machine 30 is a computer machine that is used to control the SAN 21. The SAN control machine 30 stores volume control information (e.g., information indicating a correspondence between storage control device ID and logical volume ID) that indicates which logical volume is located in which storage control device 23. The SAN control machine 30 receives requests for the assignment of logical volumes 18 from the department server [machines] 11. In response to these assignment requests, the SAN control machine 30 notifies the department server machines 11 of the contents of the volume control information. On the basis of the contents for which this notification is received, the department server machines 11 can transmit data in block units to the logical volumes 18 via the SAN 21 by creating and initializing a file system.

The storage control device 23 comprises one or a plurality of logical volumes 18, and a storage region (e.g., a memory, not shown in the figures) that is used to store path information indicating the paths to the respective logical volumes 18 or the like. The storage control device 23 receives path information from the SAN control machine 30 via a separate LAN 32, and stores this path information in a storage region. Furthermore, in cases where the storage control device 23 receives data from the department server machines 11 via the SAN 21, the storage control device 23 stores this data in the logical volumes 18 on the basis of the path information stored in the storage region.

[Each] NAS 101 comprises at least one storage device 19, and can write data into this storage device 19. Furthermore, the NAS 101 controls which data among the plurality of sets of data stored in the storage device 19 is shared data. The NAS 101 has a file server function. The NAS 101 (e.g., the OS 9 of the NAS 101) has a computer program that interprets the two file system protocols of NFS and Samba. NFS receives file access requests from computer machines in which a UNIX (registered trademark) operating system operated by NFS is installed. On the other hand, Samba receives file access requests from computer machines in which a Windows (registered trademark) operating system operated by CIFS is installed. The NAS 101 converts the file access requests (access requests at the file level) into access requests at the block level, and accesses the storage region in the storage device 19. The NAS 101 accesses an NAS storage region 8 and an NAS processor 10.

The storage device 19 may be a physical storage device (e.g., a hard disk, optical recording medium, semiconductor memory or the like), or may be a logical storage device disposed in one or a plurality of physical storage devices (e.g., a storage device called a logical unit or logical volume).

The NAS storage region 8 is a storage region that is disposed in at least one memory or hard disk (not shown in the figures) of the NAS 101 or the like; this storage region 8 can store data or computer programs. The computer programs stored in the NAS storage region 8 include (for example) the NAS side monitoring part 7. The NAS side monitoring part 7 is operated by being read into the department processor 16. The NAS side monitoring part 7 monitors the utilization state if the NAS 101, and sends information based on the monitoring results to the control subsystem 3.

The NAS processor 10 is a processor (e.g., a CPU) that is installed on the NAS 101. The NAS processor 10 reads in the NAS side monitoring part 7 from the NAS storage region 8, and executes the read in NAS side monitoring part 7.

The above has been an outline of the data migration system 100 according to this embodiment. Furthermore, in this embodiment, a separate SAN 29 can be connected to the NAS 101, and the NAS 101 can effect the migration of data to the logical volumes of the storage control device 27 via this separate SAN 29. Furthermore, specified functions of the control subsystem 3 and the functions of the department server machines 11 can also be realized by means of a single machine. For example, the migration judgment part 5, department side monitoring part 13 and migration part 15 can be disposed in the same machine.

An outline of the flow of the processing that is performed in this data migration system 100 will be described below.

The department side monitoring part 13 in [each] department server machine 11 monitors the utilization state of the shared data 24 in the department server machine 11 (e.g., how many users access which shared data or the like), and notify the control subsystem 3 of the monitored utilization state.

Furthermore, the NAS side monitoring part 7 in [each] NAS 101 monitors the utilization state of the NAS 101, and notifies the control subsystem 3 of the monitored utilization state. Here, for example, the utilization state refers to the scope of file sharing; in concrete terms, this refers to the number of sets of shared data, the number of sharing users for each set of shared data and the like.

The migration judgment part 5 of the control subsystem 3 stores the utilization state (monitoring results) from the department server machine 11 and the utilization state (monitoring results) from the NAS 101 in the control storage region 4, and compares these utilization states to each other. On the basis of the results of this comparison, the migration judgment part 5 specifies the shared data in the department server machine 11 whose migration to the NAS 101 is to be effected, and the shared data in the NAS 101 whose migration to the logical volume connected to the department server machine 11 and SAN is to be effected, and notifies the manager of the specified shared data and migration judgment results relating to the source and destination of the migration of this shared data (e.g., this information is displayed on the display screen of the control subsystem 3). Furthermore, the migration judgment part 5 may also issue migration requests to the department server machine 11 automatically on the basis of the migration judgment results without notifying the manager of the migration judgment results, and may issue commands to the department server machine 11 indicating which shared data is to be moved from which source to which destination.

The migration part 15 of [each] department server receives migration requests from the manager or the migration judgment part 5 of the control subsystem 3. The migration part 15 performs new settings relating to the sharing of data in [each] NAS 101, and migrates data (e.g., files and user information) from the migration source department servers 1. Alternatively, the migration part 15 issues new logical volume addition requests to the storage control device 23 of the SAN 21 in the department server 1, and performs the mounting and initialization of file systems for the NAS 101. As a result, data is copied from the storage device 19 of the NAS 101 into the logical volume 18 of the storage control device 23 connected to the SAN 21.

The above has been an outline of the flow of the processing that is performed in the data migration system 100. Furthermore, in this embodiment, for example, in cases where shared data in the department storage device 1 is to be caused to migrate to the NAS 101, the migration part 15 a link (especially a mounting point, for example) may be created between the location of the shared data prior to migration and the location of the shared data following migration. In this case, the migration part 15 sets this link in the control client machine 2 or NAS 101. In cases where this is set in the NAS 101, for example, the migration part 15 generates a mounting point in the shared directory (not shown in the figures) of the NAS 101. As a result, the control client machine 2 can access the shared data even if the shared data migrates from the department server machine 11 to the NAS 101.

This embodiment will be described in greater detail below.

Figure 2A:
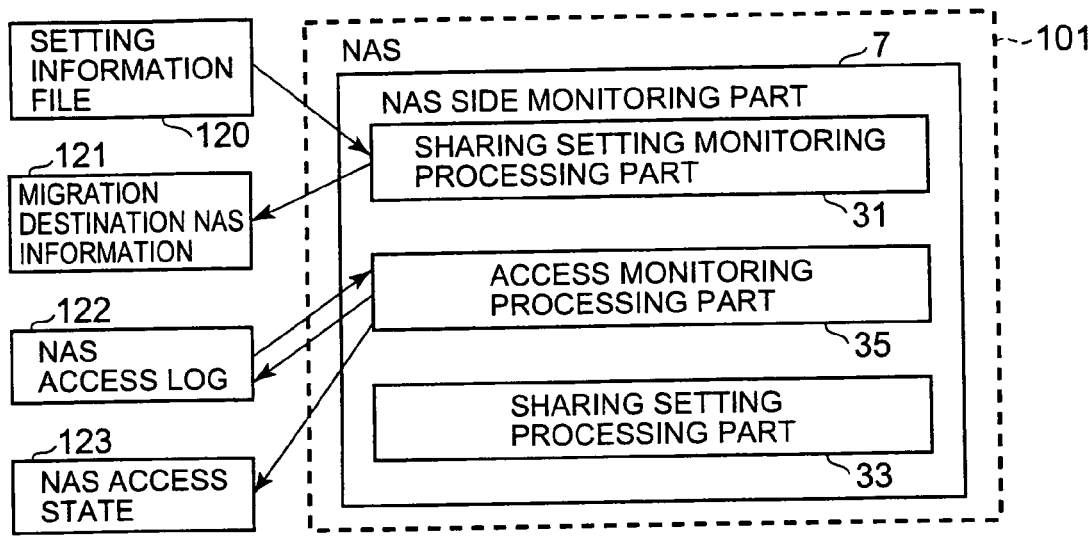
FIG. 2A shows an example of the construction of the NAS.

FIG. 2A shows an example of the construction of the NAS 101. Furthermore, in the following description, shared directories or shared files may be referred to as disclosed directories or disclosed files.

The NAS side monitoring part 7 of [each] NAS 101 comprises a sharing setting monitoring processing part 31, a sharing setting processing part 33 and an access monitoring processing part 35.

The sharing setting monitoring processing part 31 monitors the setting information file 120 in which setting information relating to the sharing of data is stored, either periodically or at irregular times, and inputs setting information. Furthermore, the sharing setting monitoring processing part 31 produces migration destination NAS information 121 on the basis of the input setting information and the disclosed directory specified by this setting information, and outputs this migration destination NAS information 121 to a specified storage region (e.g., the department storage device 25).

In concrete terms, for example, in the case of NFS, the setting information file 120 may be an environment setting file known as "export". The sharing setting monitoring processing part 31 inputs setting information such as that shown for example in FIG. 3A from this file 120. The setting information includes disclosed directory specifying information (e.g., directory names) used to specify disclosed directories (or disclosed files), and one or more sets of machine specifying information (e.g., host names) used to specify one or more machines that can access these disclosed directories. Furthermore, for each set of machine specifying information, an access authorization for the machine indicated by the machine specifying information (e.g., write and read possible, read only possible, or neither write nor read possible) is registered in the setting information. The setting information shown for example in FIG. 3A means that "for client 01, the NAS 101 is disclosed so that files stored at /share or less can be written and read (rw (read/write)), and for client 02, the NAS 101 is disclosed so that files stored at /share or less can only be read (ro (read only))". The contents of the setting information can be altered by the system manager.

Furthermore, the sharing setting monitoring processing part 31 produces migration destination NAS information 121 such as that shown for example in FIG. 3B on the basis of the input setting information and the disclosed directories specified by this setting information (e.g., the number and size of files present in lower positions than the disclosed directories), and outputs this migration destination NAS information 121. For example, the migration destination NAS information 121 contains information elements such as the number of accessing users (or hosts), the total number of shared directories, and the total size of shared directory files. The manner in which these information elements are produced will be described later.

Thus, the sharing setting monitoring processing part 31 produces migration destination NAS information 121 relating to its own NAS 101. This information 121 can be updated each time that monitoring of the setting information file 121 is monitored.

In cases where read processing or write processing of shared data is performed, the access monitoring processing part 35 shown in FIG. 2A records the accessed shared directory and access source in an NAS access log 122, tabulates this NAS access log, produces shared directory access state information 123, and outputs this information 123 to the migration judgment part 5.

In concrete terms, for example, in the case of NFS; the information elements contained in the NAS access log 122 include (as shown for example in FIG. 4A) the date of access, access source information that is used to specify the access source (e.g., IP address), access destination information used to specify the access destination (e.g., directory name or file name), operating information (e.g., whether the operation is read or write), and size of the data that is read or written. In cases where read processing or write processing of shared data is performed, the access monitoring processing part 35 writes these information elements into the NAS access log 33 (this processing may be performed by a separate program that performs the writing or reading of data).

The access monitoring processing part 35 produces NAS access state information 123 such as that shown for example in FIG. 4B on the basis of the contents of the NAS access log 122. The number of accessing users (hosts) for each shared directory, and the number of times of read/write, are recorded in the NAS access state information 123. Specifically, for each shared directory that appears in the access destination information of the NAS access log 122, the access monitoring processing part 35 tabulates the number of accessing users (hosts) and the number of times of read/write, and produces NAS access state information 123 on the basis of the results of this tabulation. The concrete tabulation that is performed will be described in detail later.

Furthermore, the access destination information of the NAS access log 122 may be expressed in either directory units or file units. If this information is expressed in file units, the number of accessing users can be tabulated for each shared file, and only specified files among the plurality of files belonging to a certain shared directory can be caused to migrate on the basis of the results of this tabulation (e.g., control which is such that only files with a plurality of accessing users are caused to migrate, and files with a single accessing user are prevented from migrating, is possible).

The sharing setting processing part 33 shown in FIG. 2A prepares file systems (e.g., prepares file systems in accordance with requests from the control subsystem 3 or department servers 11), performs the setting of file sharing (and user registration), and creates a file sharing environment. In concrete terms, for example, the sharing setting processing part 33 inputs all or part of the setting information from the setting information file 120 (e.g., a combination of host names or user accounts and access authorization), performs the setting of file sharing on the basis of this input information, and outputs information indicating the success of this setting.

Figure 2B:
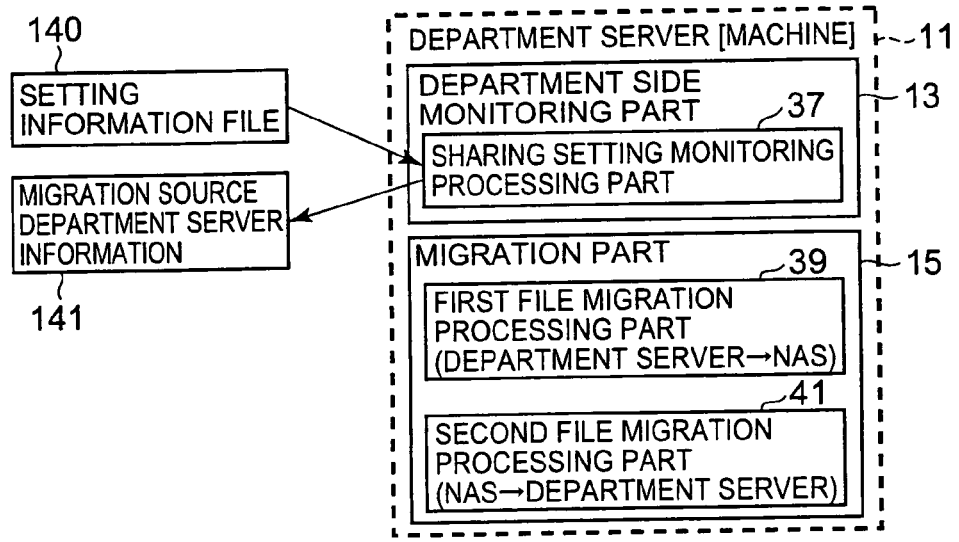
FIG. 2B shows an example of the construction of the department server machine.

FIG. 2B shows an example of the construction of the department servers 11.

As was described above, each department server 11 comprises a department side monitoring part 13 and a migration part 15. The department side monitoring part 13 has a sharing setting monitoring processing part 37. The migration part 13 comprises a first file migration processing part 39, and a second file migration processing part 41.

Like the sharing setting monitoring processing part 31 in the NAS 101, the sharing setting monitoring processing part 37 monitors the setting information file 140 in which setting information related to data sharing is stored, either periodically or at irregular times, and inputs setting information. Furthermore, the sharing setting monitoring processing part 37 produces migration source department server information 141 on the basis of the input setting information and the disclosed directory specified by this setting information, and outputs this migration source department server information 141 to a specified storage region (e.g., the department storage device 25). An example of the construction of the setting information that is input from the setting information file 140 is shown in FIG. 5A, and an example of the construction of the migration source department server information 141 is shown in FIG. 5B. As is seen from FIG. 5A, the setting information has the same construction as the setting information that is input from the setting information file 120 in the NAS 101. Furthermore, as is seen from FIG. 5B, the construction of the migration source department server information 141 is substantially similar to the construction of the migration destination NAS information 121, differing only in that there are no upper limit values for the information elements of the number of accessing users (hosts), the total number of shared directories and the total shared file size (furthermore, upper limit values may be set for the respective information elements in the migration source department server information 141).

Furthermore, for example, in the department server machines 11, directory path names disclosed on the network are listed in the environment setting file for the file sharing function (export file in the case of NFS, samba.conf file in the case of Samba). The files located under the listing of this directory are shared files. Accordingly, such shared files are migration candidates. In other words, since files belonging specifically to department server machines 11 need not be shared, these files are not placed in the disclosed directory; accordingly, the department server machines 11 can judge that files under the listing of the disclosed directory are shared files that are candidates for migration.

The first file migration processing part 39 performs processing that migrates shared data (e.g., shared directories or shared files) stored in the storage devices 25 of the department server machines 11 to the NAS 101. For example, the first file migration processing part 39 receives file migration requests from the manager or the migration judgment part of the control subsystem 3, and starts processing in response to these file migration requests (e.g., requests including the designation of the migration object data and the designation of the migration destination). The first file migration processing part 39 inputs the name of the migration destination NAS designated in the received file migration request, and issues a file sharing setting request to the NAS 101 that has this migration destination NAS name; as a result, the sharing setting processing part 33 in the NAS 101 is executed. Furthermore, in cases where the first file migration processing part 39 receives notification from the sharing setting processing part 33 that the shared directory in the NAS 101 has become effective (notification indicating that the setting of file sharing has been successful), the data in the department storage device 25 is caused to migrate to the shared directory that has become effective in the NAS 101. The first file migration processing part 39 outputs migration result information indicating whether or not the migration has been successful to the file migration request transmission source.

The second file migration processing part 41 performs processing that migrates the shared data stored in the storage device 19 of the NAS 101 to the storage device 25 of the department server machine 11. For example, the second file migration processing part 41 receives file migration requests from the manager or the migration judgment part of the control subsystem 3, and starts processing in response to these file migration requests (e.g., requests containing the designation of the migration object data and the designation of the migration destination). The second file migration processing part 41 inputs the migration destination server name designated in the received file migration request, and issues a request to the department server that has this migration destination server name. The second file migration processing part 41 of the department server machine 11 that has received this request ensures a logical volume 18 via the SAN 21, and also performs initialization for the ensured logical volume 18, so that a file system for this logical volume 18 is constructed. The second file migration processing part 41 then reads out the data designated by the abovementioned received file migration request from the NAS 101, and migrates the read-out data to the abovementioned ensured logical volume 18. The second file migration processing part 41 outputs migration result information indicating whether or not the migration was successful to the file migration request transmission source.

Furthermore, in the migration processing performed by the first file migration processing part 39 and second file migration processing part 41, in cases where the migration source and migration destination are located in the same machine, and in which the OS and file system are the same and the migration object data is stored in a logical volume, there may be cases in which it is sufficient merely to perform the switching of paths controlled in this same machine instead of performing data migration.

Figure 2C:
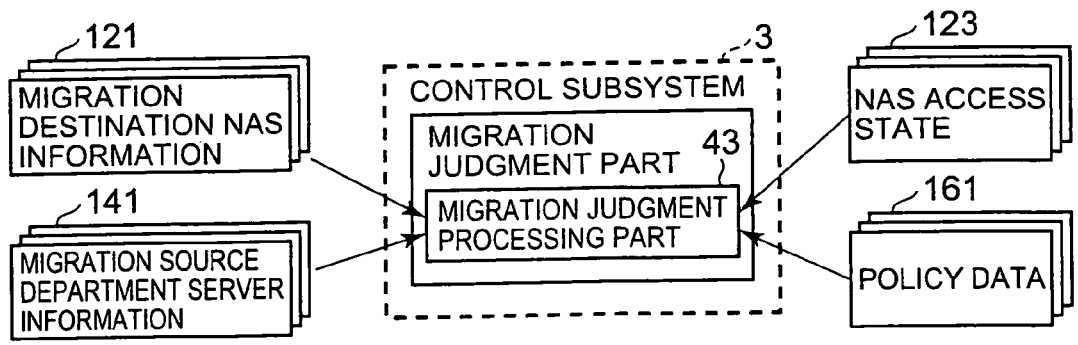
FIG. 2C shows an example of the construction of the management subsystem.

FIG. 2C shows an example of the construction of the control subsystem 3.

The migration judgment part 5 of the control subsystem 3 comprises a migration judgment processing part 43. The migration judgment processing part 43 receives migration destination NAS information 121 and NAS access state information 123 from the respective NAS 101A, 101B and 101C, and also receives migration source department server information 141 from the respective department server machines 11A, 11B and 11C. Furthermore, the migration judgment processing part 43 inputs policy data 161 (e.g., data constructed by the manager). The migration judgment processing part 43 determines the migration object data and migration destination on the basis of the received plurality of sets of migration destination NAS information 121, plurality of sets of migration source department server information 141, plurality of sets of NAS access state information 123 and policy data 161, and issues a file migration request containing the content of this determination to the department server machine 11 [in question].

In concrete terms, for example, the migration judgment processing part 43 can produce NAS tabulation information 171 such as that shown for example in FIG. 6A from the plurality of sets of migration destination NAS information 121. The NAS tabulation information 171 contains, for each set of migration destination NAS information 121, the ID of the NAS that produced this information 121, and the content of this information 121 produced by this NAS.

Furthermore, for example, migration judgment processing part 43 can produce department server tabulation information 173 such as that shown for example in FIG. 6B from the plurality of sets of migration source department server information 141. The department server tabulation information 173 contains, for each set of migration source department server information 141, the ID of the department server that produced this information 141, and the content of this information 141 produced by this department server.

Furthermore, for example, the migration judgment processing part 43 can produce NAS state tabulation information 175 such as that shown for example in FIG. 6C from the plurality of sets of NAS access state information 143. The concrete manner in which this information 175 is produced will be described later.

The migration judgment processing part 43 can select the migration destination on the basis of such respective types of tabulation information 171, 173 and 175 and the abovementioned policy data 161.

FIG. 7 shows an example of the construction of the policy data 161.

The policy data 161 contains first setting policy data and second setting policy data. The first setting policy data indicates the policy relating to data migration from the department servers to the NAS, and the second setting policy data indicates the policy relating to data migration from the NAS to the department servers.

For example, the setting policy data contains at least one type of policy data selected from migration timing policy data that indicates the policy relating to migration timing, and migration destination policy data that indicates the policy relating to the migration destination, as data elements.

For example, the policy of migration timing in the first setting policy data is based on the number of accessing users (hosts) and the shared file size. The policy indicating what type of processing is performed in the case of what number of accessing users (i.e., what number of file sharing users), and the policy indicating what type of processing is performed in the case of what shared file size, are set in this migration timing policy data. There are three types of processing, i.e., warning, preliminary notification of migration, and migration; however, the types of processing used are not limited to these.

For example, the migration timing policy in the second setting policy data is based on the access number and total read size or total write size (the total read size and total write size will be described later). The policy indicating what type of processing is performed in the case of what access number, and the policy indicating what type of processing is performed in the case of what total read size or what total write size, are set in this migration timing policy data. Furthermore, the total read size can be determined (for example) by counting the size of the data that is read each time that read processing is performed by the NAS 101 or the department servers 11. Similarly, furthermore, the total write size can be determined by counting the size of the data that is written each time that write processing is performed by the NAS 101 or department servers 11.

One or more migration destination candidates (e.g., NAS) corresponding to each of the plurality of migration sources (e.g., department servers) are set in the migration destination policy data.

For example, the migration judgment processing part 43 can specify the migration destinations by the following method using such policy data 161.

The migration judgment processing part 43 acquires the name (this information item is not limited to the name, but may be some other type of ID) of the department server that is the transmission source of certain migration source department server information 141, and acquires the migration destination candidate corresponding to the acquired department server name from the policy data 161 (especially migration destination policy data). In the example shown in FIG. 7, in a case where the acquired department server name is "department server 1", "NAS 1" and "NAS 2" are acquired as migration candidates.

Next, the migration judgment processing part 43 acquires respective migration destination NAS information 121 (see FIG. 6A) relating to respective migration candidate NAS 101. Furthermore, the migration judgment processing part 43 acquires migration source department server information 141 (see FIG. 5B or FIG. 6*b*) relating to the department server that has the abovementioned acquired department server name.

The migration judgment processing part 43 compares the respective sets of migration destination NAS information 121 and migration source department server information 141, and selects the NAS for which migration is possible. In the examples shown in FIGS. 6A and 6B, the accessing user number of the department server 1 is 100, and in cases where this number fills the accessing user number, the upper limit value of the accessing user number is exceeded in the NAS 2; accordingly, the NAS 1, which does not exceed this upper limit value or other types of upper limit values is selected.

One example of a method in which the migration destination was selected on the basis of migration destination policy data contained in first setting policy data was described above. However, the present invention is not limited to this; migration destination timing policy data or second setting policy data may also be used.

The flow of the processing that is performed by the various types of computer programs described above will be described in detail below.

Figure 8:
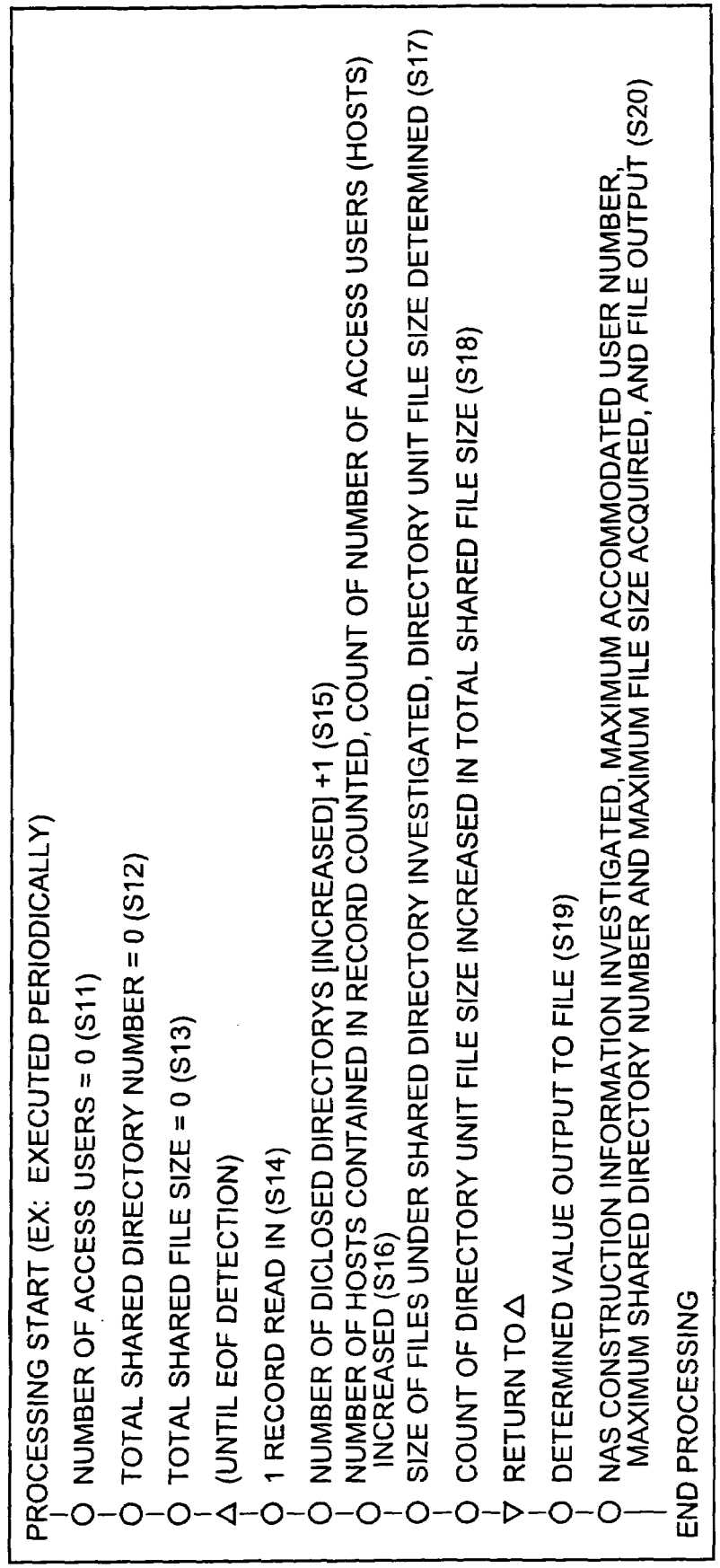
FIG. 8 shows one example of the flow of the processing that is performed by the sharing setting monitoring processing part in the NAS.

FIG. 8 shows one example of the flow of the processing that is performed by the sharing setting monitoring processing part 31 in the NAS 101. Furthermore, the meanings of the symbols shown in FIGS. 8 and 9 and FIGS. 11 through 15 are as follows:

Double circle: call-up of a function (subroutine, subprogram or the like)
● (black circle): unconditional branching (proceeding or returning at the location of the black circle)
○ (circle): expresses processing
Δ (triangle): start of loop processing
∇ (inverted triangle): end of loop processing
◇ (diamond): conditional branching
+ (cross): start at branching destination
▲ (black triangle): start of nested loop processing
▼ (black inverted triangle): end of nested loop processing If a condition is satisfied in the case of a diamond, the processing on the right side indicated by - - - + is executed; if this condition is not satisfied, the processing proceeds to the step below.

For example, the sharing setting monitoring processing part 31 starts periodically.

The sharing setting monitoring processing part 31 sets the accessing user number equal to 0, the total number of shared directories equal to 0, and the total shared file size equal to 0, for the NAS storage region 8 (steps S11, S12 and S13).

The sharing setting monitoring processing part 31 reads in one record from the setting information file 120 (e.g., the environment setting file) (S14). For example, the following record elements (A) through (C) are contained in the record that is read in from the setting information file 120 (see FIG. 3A):

(A) Disclosed directory specifying information used to specify disclosed directories.
(B) One or more sets of host specifying information (e.g., host names) used to specify one or more accessible hosts (department client machines) in these disclosed directories.
(C) Access authorization assigned to the respective hosts.

The sharing setting monitoring processing part 31 acquires one set of disclosed directory specifying information from the record acquired in S14, and increases the count of the disclosed directory number (S15).

Furthermore, the sharing setting monitoring processing part 31 increases the count of the accessing user number by the number of sets of host specifying information contained in the record acquired in S14 (S16).

Furthermore, the sharing setting monitoring processing part 31 calculates the directory unit file size (i.e., the total file size of the one or more files that are present under the listing of the disclosed directory) from the size of the respective files that are present under the listing of the disclosed directory indicated by the disclosed directory specifying information (S17). Furthermore, the sharing setting monitoring processing part 31 adds the calculated directory unit file size to the total shared file size (S18).

The sharing setting monitoring processing part 31 repeats the processing of S14 through S18 until the EOF (end of file) of the setting information file 120 is detected.

Subsequently, the sharing setting monitoring processing part 31 outputs the accessing user number whose count has been increased, the total shared directory number and the total shared file size to the file (S19). Furthermore, the sharing setting monitoring processing part 31 acquires the maximum accommodated user number, maximum shared directory number and maximum file size from the construction information for its own NAS 1, and outputs these acquired information elements to the abovementioned file (S20). As a result of this S19 and S20, migration destination NAS information 121 is constructed. The sharing setting monitoring processing part 31 stores this migration destination NAS information 121 in the NAS storage region 8, and may immediately output this information 121 to the migration judgment part 5, or may output this migration destination NAS information 121 to the migration destination judgment part 5 when a request is received from the manager or migration judgment part 5. Furthermore, for example, the abovementioned construction information is accumulated in the NAS storage region 8. At least one of the information elements among the maximum accommodated user number, maximum shared directory number and maximum file size can be input by the manager and stored in the NAS storage region 8.

Figure 9:
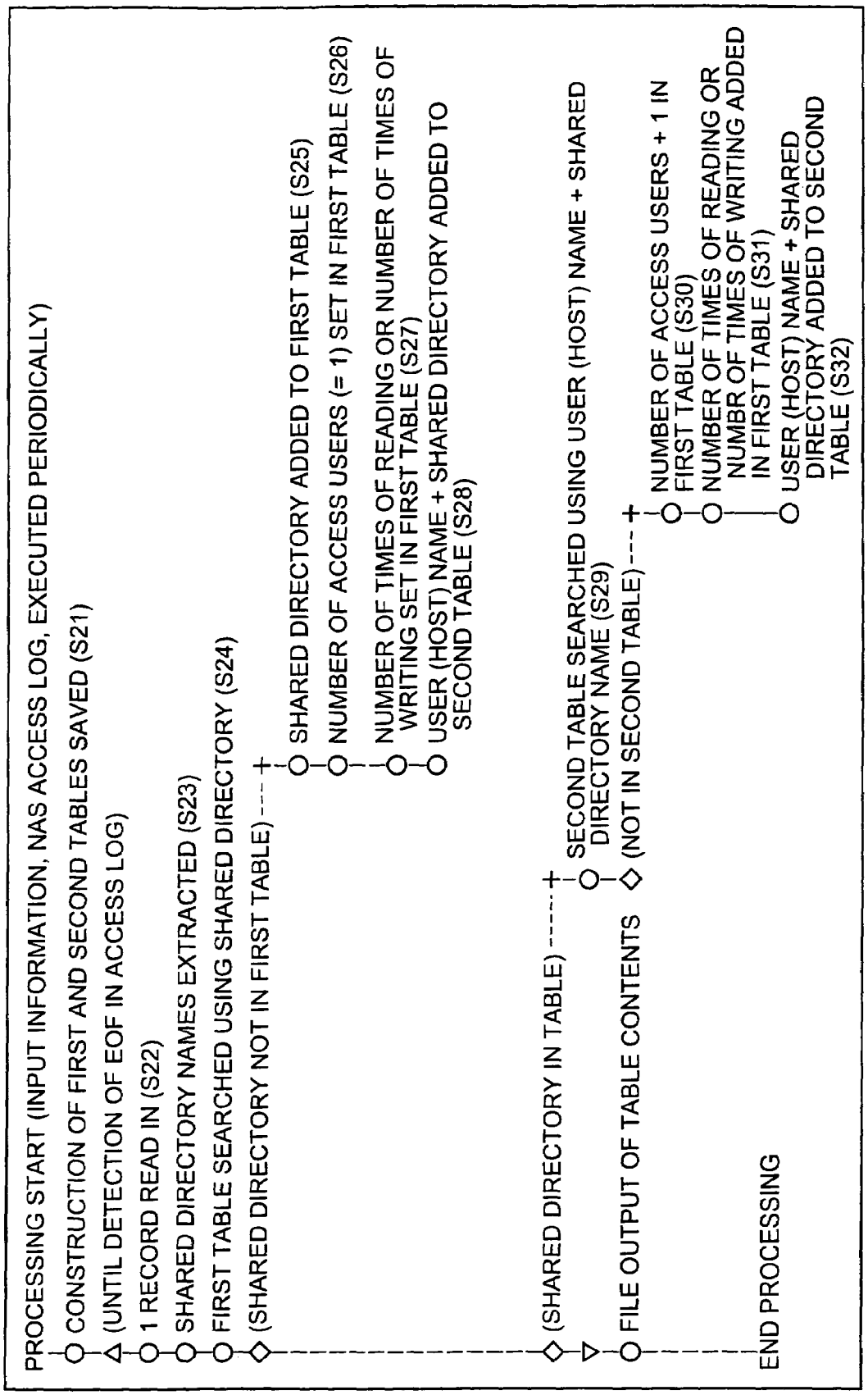
FIG. 9 shows one example of the flow of the processing that is performed by the access monitory processing part in the NAS.

FIG. 9 shows one example of the flow of the processing that is performed by the access monitoring processing part 35 in the NAS 101.

The access monitoring processing part 35 inputs the NAS access log 122 (see FIG. 4A) from the NAS storage region 8 or storage device 19. Furthermore, for example, the access monitoring processing part 35 starts periodically.

For example, the access monitoring processing part 35 ensures first and second table regions in the NAS storage region 8 (S21).

Next, the access monitoring processing part 35 reads in one record from the input NAS access log 122 (S22). The access date, access source information (host name or IP address), access destination information (e.g., shared directory name), operating information and size are contained in the record that is read in here.

The access monitoring processing part 35 extracts the shared directory name from the record acquired in S22 (S23). Then, the access monitoring processing part 35 searches the first table (see FIG. 10A) using the extracted shared directory name as a search key (S24).

In cases where there is no search hit in S24, the access monitoring processing part 35 adds the shared directory name extracted in S23 to the first table (S25). The access monitoring processing part 35 sets 1 as the accessing user number in the first table (S26). Furthermore, the access monitoring processing part 35 sets 1 as the number of times of reading or number of times of writing in the first table in accordance with the operating information (read or write) contained in the extracted record (S27). Furthermore, the access monitoring processing part 35 adds the user (host) name and shared directory name to the second table (S28).

In cases where there is a search hit in S24, the access monitoring processing part 35 acquires the access source information (host name or IP address) and access destination information (shared directory name) from the record that was read in S22, and searches the second table using a set consisting of the host name and shared directory name as a search key (S29).

In cases where there is no search hit in S29, this means that the shared directory was accessed by a new host (user). In the first table, the access monitoring processing part 35 adds 1 to the accessing user number corresponding to the shared directory name in the record (S30), and adds 1 (in accordance with the operating information in the record) to the number of times of reading or number of times of writing in the first table corresponding to the shared directory name in the record (S31). The access monitoring processing part 35 ads a set consisting of the host name and shared directory name to the second table (S32).

In cases where there is a search hit in S29, the access monitoring processing part 35 may return to the processing of S22, or may perform processing that adds the number of times of reading/writing in the first table corresponding to the shared directory name in the record extracted in S22.

The access monitoring processing part 35 repeats the processing of S22 through S32 until the EOF (end of file) of the NAS access log 122 is detected. As a result, the first table shown for example in FIG. 10A or the second table shown for example in FIG. 10B is updated. Furthermore, as a result of the abovementioned processing, even if the same host performs access (reading or writing) a number of times for the same shared directory in the first table, an increase in the accessing user number can be prevented.

The access monitoring processing part 35 outputs the first table as NAS access state information 123 (see FIG. 4B) (S33).

FIG. 11 shows one example of the flow of the processing that is performed by the sharing setting processing part 33 the NAS 101.

The sharing setting processing part 33 inputs setting information (e.g., an environment setting file) relating to file sharing.

For example, the sharing setting processing part 33 requests the assignment of a logical volume from a specified computer (e.g., the control subsystem 3) (S41). In response to this, for example, the sharing setting processing part 33 receives volume discriminating information or the like, so that a volume is mounted (S42), and the sharing setting processing part 33 constructs a file system by performing volume initialization (S43). The sharing setting processing part 33 merges the input setting information with the migration destination (S44). Furthermore, in cases where user information such as a user count or the like is contained in the setting information, the sharing setting processing part 33 may also register this user information in the migration destination.

Figure 12:
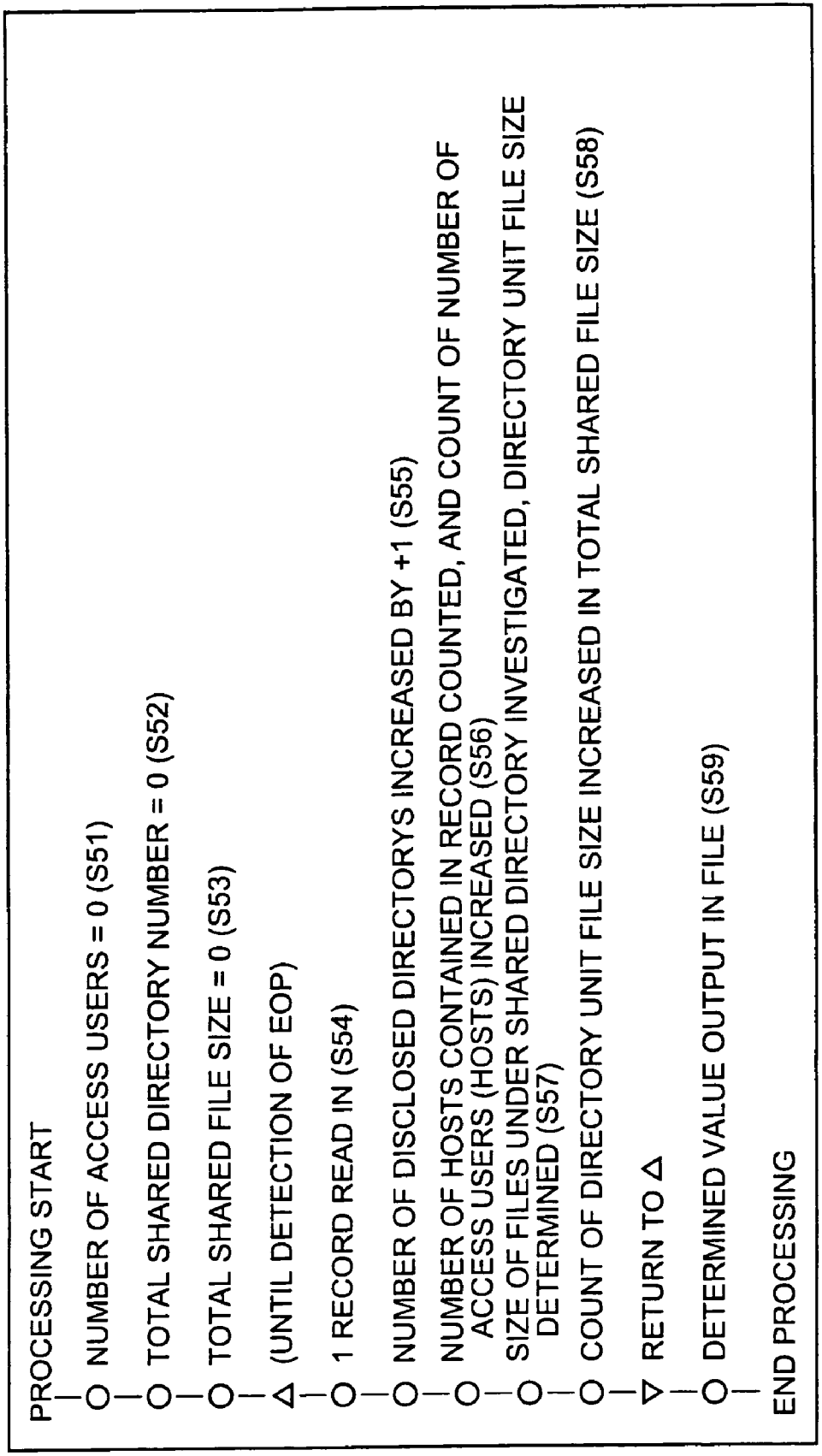
FIG. 12 shows one example of the flow of the processing that is performed by the sharing setting monitoring processing part in the department server machines.

FIG. 12 shows one example of the flow of the processing that is performed by the sharing setting monitoring processing part 37 in the department server machine 11.

For example, the sharing setting monitoring processing part 37 starts periodically, and performs processing similar to S11 through S19 (in FIG. 8) of the sharing setting monitoring processing part 31 in the NAS 101 (S51 through S59).

FIG. 13 shows one example of the flow of the processing that is performed by the first file migration processing part 39 in the department server machine 11.

For example, the first file migration processing part 39 starts by being called up by the migration judgment processing part 43. For example, the first file migration processing part 39 inputs the migration destination NAS name.

The first file migration processing part 39 acquires setting information relating to file sharing in the department server machine 11 (e.g., a setting information file 140) (S61), calls up the sharing setting processing part 33 for the determined migration destination NAS (the NAS specified by the input migration destination NAS name), and causes the file sharing setting processing shown in FIG. 11 to be executed (S62).

The first file migration processing part 39 migrates the migration object data in the department storage device 25 to the abovementioned migration destination NAS (S63).

Furthermore, the first file migration processing part 39 prepares a mounting point in the shared directory of the migration destination NAS, and mounts this (S64). As a result, even if access to this migration object data is received by the department server machine 11 after the migration object data is caused to migrate to the NAS, file access to this migration object data from the department server machine 11 is possible. Furthermore, if a method is adopted in which the first file migration processing part 39 sets a deadline on the mounting point, deletes this mounting point when this deadline is exceeded, and notifies the department client machine 2 of the migration destination of the data, the department client machine 2 can subsequently access the NAS 1 directly.

FIG. 14 shows one example of the flow of the processing that is performed the second file migration processing part 39 in the department server machine 11.

For example, the second file migration processing part 39 inputs the migration destination department server name.

For example, the second file migration processing part 39 transmits a request for the assignment of a logical volume 18 to the SAN control machine 30 (S71). In response to this assignment request, the second file migration processing part 39 receives the content of the volume control information, and performs the mounting of a volume and the creation and initialization of a file system on the basis of this content (S72 and S73). The second file migration processing part 39 copies (or causes the migration of) the data in the shared directory of the of the NAS 101 to the mounted logical volume 18 (S74).

Figure 15:
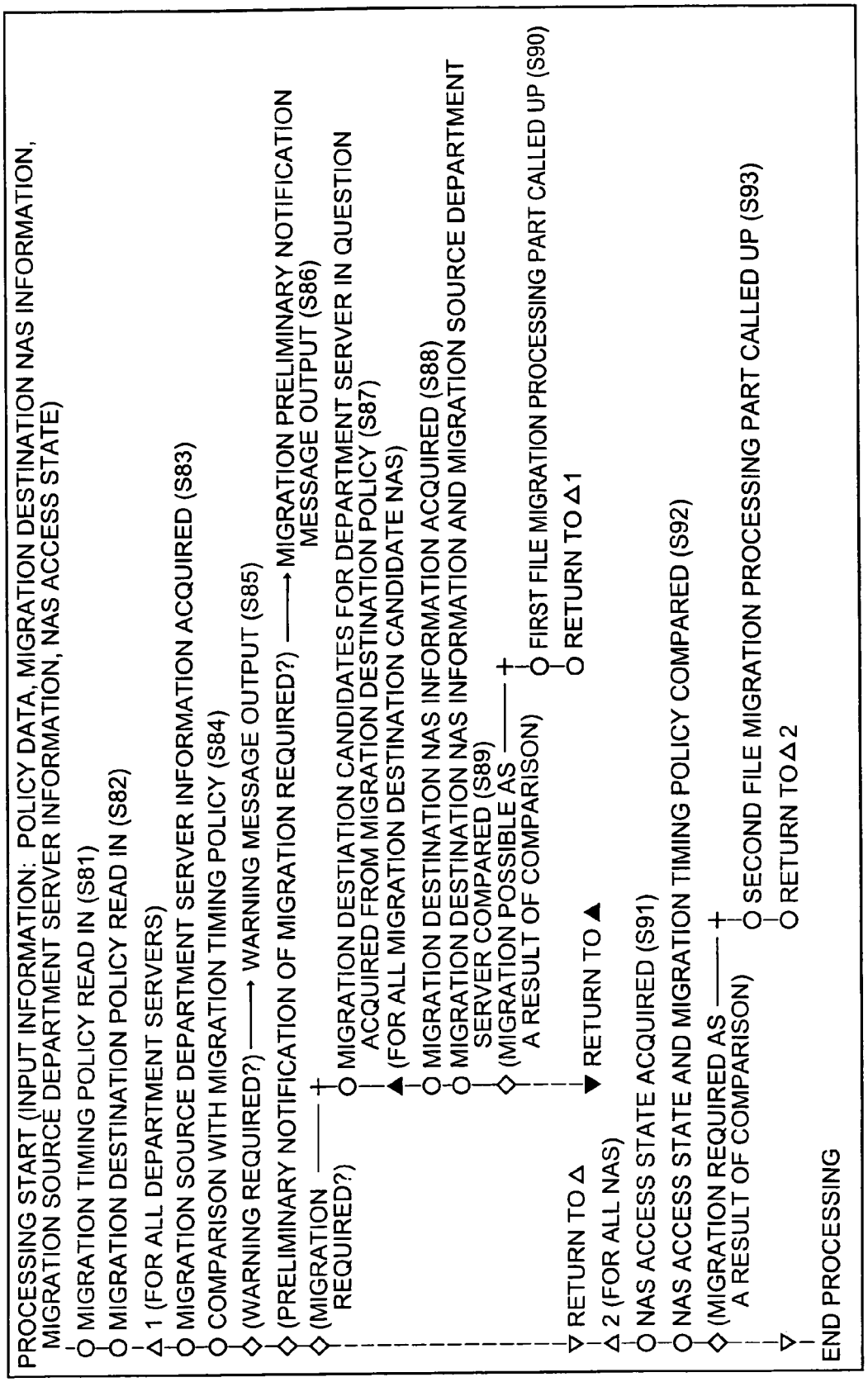
FIG. 15 shows one example of the flow of the processing that is performed by the migration judgment processing part.

FIG. 15 shows one example of the flow of the processing that is performed by the migration judgment processing part 43.

The migration judgment processing part 43 reads in all of the migration timing policy data and migration destination policy data registered in the policy data 161 (S81 and S82).

The migration judgment processing part 43 performs processing which uses the first setting policy data, in other words, processing in the case where the department server is the migration source.

The migration judgment processing part 43 acquires respective sets of migration source department server information 141 from the respective department servers 11 (S83), and compares the respective acquired sets of migration source department server information 141 and the migration timing policy data in the first setting policy data (S84).

If a result of "warning" is obtained as a result of S84, the migration judgment processing part 43 outputs a warning message (e.g., displays a warning message) (S85). If a result of "preliminary notification of migration" is obtained, the migration judgment processing part 43 outputs a migration preliminary notification message (e.g., a message indicating preliminary notification of the migration of shared data to the NAS in the near future) (S86).

If a result of "migration" is obtained as a result of S84, the migration judgment processing part 43 refers to the migration destination policy data in the first setting policy data, and acquires migration destination candidates from the department server 11 that has this migration judgment processing part 43 (S87). In concrete terms, for example, the migration judgment processing part 43 acquires one or more NAS names corresponding to the name of the department server 11. The migration judgment processing part 43 acquires migration destination NAS information 121 from all of the acquired migration destination candidate NAS (S88), and compares the acquired migration destination NAS information 121 and the migration destination department server information 141 acquired in S83 (S89). If migration is possible to at least one migration destination candidate NAS as a result of this S89, the migration judgment processing part 43 calls up the first file migration processing part 39 ((S90), and executes data migration from the department server to the NAS. For example, a judgment as to whether or not migration is possible is made according to whether or not the value of the accessing user (host) number or the like in the department server exceeds the upper limit value even when added to a specified accumulated value of the migration destination candidate NAS information 121.

When the migration judgment processing part 43 has performed the processing of S83 through S90 for all of the department servers 11, the migration judgment processing part 43 performs the processing of S91 through S93 below for all fo the NAS 101 using the second setting policy data.

The migration judgment processing part 43 acquires respective sets of NAS access state information 123 from the respective NAS 101. The migration judgment processing part 43 compares the acquired NAS access state information 123 and the migration timing policy in the second setting policy data (S92). In cases where migration is required as a result of S92, the second file migration processing part 41 is called up (S93), and data migration from the NAS to the department server is executed.

Thus, in the embodiment described above, the utilization states of a plurality of migration destination candidates (e.g., NAS) and the utilization states of shared data in a plurality of migration sources (e.g., department servers) are output to the migration judgment part 5, and migration destinations for shared data are selected by the migration judgment part 5 from a plurality of migration destination candidates. As a result, data migration can be accomplished without placing the burden of manual data migration on the user, and without increasing the cost.

Furthermore, in the abovementioned embodiment, migration destinations are selected on the basis of a plurality of sets of migration destination NAS information (monitoring results for the respective NAS), a plurality of sets of migration source server information (monitoring results for respective department servers) and policy data. As a result, data migration in accordance with the intentions of the user can be accomplished.

Furthermore, in the abovementioned embodiment, the respective department server machines 11 produce migration source department server information 141, and notify the migration judgment part 5 of this information; accordingly, the generation of a file server can be detected in the computer machine of the migration judgment part 5.

Preferred embodiments of the present invention were described above; however, these embodiments are merely examples used to illustrate the present invention; the scope of the present invention is not limited to these embodiments alone. The present invention can be worked in various aspects. For example, in the embodiments described above, the present invention was described mainly in terms of a case in which migration was effected from department servers to NAS. However, the present invention is of course not limited to this. The abovementioned embodiments may also be applied to various systems without any restrictions on the type of migration destinations or the type of migration sources. For example, the migration destination candidates may also be volumes connected to an SAN, and the migration sources may be NAS. Furthermore, for example, both the migration destination candidates and migration sources may [alike] be volumes connected to an SAN, or NAS. Furthermore, the present embodiments may also be applied to either open type systems or main frame type systems. Furthermore. Separate servers may be installed instead of the department servers 11. Furthermore, for example, in both the department servers 11 and NAS 101, in the case of shared data in which either the number of times of reading or number of times of writing is zero in the NAS access state information 123, the shared data can be deleted, and if the number of times of reading, number of times of writing or total of both numbers of times is less than a specified threshold value, this shared data can be caused to migrate to the NAS, while if the number of times of reading, number of times of writing or total of both numbers of times is equal to or greater than this specified threshold value, the shared data can be caused to migrate to a logical volume connected to the SAN.

What is claimed is:

1. In a case where one or more servers that control first shared data that is shared by a plurality of clients, and a plurality of network attached storages (NAS) that store a plurality of sets of second shared data, are provided, an hardware apparatus comprising:

a first input part that receives from the respective servers server state information that indicates information relating to a utilization state of first shared data in the respective servers, wherein the utilization state of first shared data is information that is produced by said servers based on updating of selling information relating to data sharing in the servers;

a second input part that receives NAS state information that indicates information relating to a utilization state from the plurality of NAS connected to a network, wherein the utilization state from the plurality of NAS is information that is produced by said plurality of NAS, based on updating of setting information relating to data sharing in the plurality of NAS;

a monitoring part which monitors the setting information relating to the data sharing in the servers and the setting information relating to the data sharing in the plurality of NAS; and a selection part which, when the utilization state of said first shared data or said utilization state of said second shared data is updated, compares said input server state information and NAS state information to each other, selects which data among said plurality of first shared data or said plurality of second shared data is to be taken as the data that is the object of migration on the basis of the comparison results, further selects as a data migration destination, a server or NAS from said one or more servers or said plurality of NAS, and outputs information relating to the results of this selection.

2. The apparatus according to claim 1, which further comprises a migration part that migrates said selected migration object data to said selected migration destination.

3. The apparatus according to claim 2, wherein in a case where the first shared data is selected as said migration object data and an NAS is selected as the migration destination, said migration part acquires setting information relating to data sharing in a server that controls said first shared data, merges the acquired setting information with the migration destination NAS, prepares a storage region in the migration destination NAS, and migrates said migration object data to the prepared storage region.

4. The apparatus according to claim 2, wherein a storage control device is connected to a storage area network (SAN), said storage control device can prepare a logical volume, said second shared data is stored in a shared directory of an NAS, and in a case where second shared data is selected as said migration object data, and one of said one or more servers is selected as the migration destination, said migration part migrates the second shared data selected as said object of migration from said shared directory to said logical volume.

5. The apparatus according to claim 1, wherein said selection part inputs selection policy data in which a policy for selecting migration object data and migration destinations is written, and selects migration object data and migration destinations that match the conditions written the input selection policy data.

6. The apparatus according to claim 1, wherein said selection part receives access state information from the plurality of NAS connected to a network indicating the access state in the plurality of NAS, and this selection part performs a selection on the basis of the results of said comparison in cases where an NAS is selected as the migration destination, and performs a selection on the basis of said received access state information in cases where a server is selected as the migration destination.

7. The apparatus according to claim 6, wherein said selection part inputs selection policy data in which a policy for selecting migration object data and migration destinations is written, and selects migration object data and a migration destination that match the policy written in the input selection policy data, a first policy which is a policy for migrating first shared data from the servers to the plurality of NAS, and second policy which is a policy for migrating second shared data from the plurality of NAS to the servers, are written in the selection policy data, a policy relating to the server state information and NAS state information is contained in said first policy, and a policy relating to said access state information is contained in said second policy.

8. In a case where one or more servers which control first shared data that is shared by a plurality of clients, and a plurality of network attached storages (NAS) that store a plurality of sets of second shared data, are provided, a method comprising:

receiving server state information which indicates information relating to a utilization state of first shared data in the respective servers from the respective servers, wherein the utilization state of first shared data is information that is produced by said servers based on updating of setting information relating to data sharing in the servers;

receiving NAS state information which indicates information relating to a utilization state from the plurality of NAS connected to a network, wherein the utilization state from the plurality of NAS is information that is produced by said plurality of NAS, based on updating of setting information relating to data sharing in the plurality of NAS;

monitoring the setting information relating to the data sharing in the servers and the setting information relating to the data sharing in the plurality NAS; and when the utilization state of said first shared data or said utilization state of said second shared data is updated, comparing said input server state information and NAS state information to each other, selecting the data among said plurality of sets of first shared data or said plurality of second shared data that is to be taken as the migration object data based on the results of this comparison, selecting, as a data migration destination, a server or NAS from said one or more servers or said plurality of NAS, and outputting information relating to the results of this selection.

9. The method according to claim 8, wherein each of said servers comprise a server side monitoring part which monitors updating of setting information relating to data sharing in the servers, wherein each of said plurality of NAS comprise an NAS side monitoring part which monitors updating of setting information relating to data sharing in each NAS, wherein said server side monitoring part produces said server state information based on setting information relating to data sharing in the servers, and outputs said produced server state information, and wherein said NAS side monitoring part produces said NAS state information based on setting information relating to data sharing in each NAS, and outputs said produced NAS state information.

* * * * *